United States Patent
Brandmeier

(10) Patent No.: US 11,310,962 B2
(45) Date of Patent: Apr. 26, 2022

(54) HARVESTING MACHINE AND SWIVEL CONVEYOR SCREW THEREFOR

(71) Applicant: CLAAS Selbstfahrende Erntemaschinen GmbH, Harsewinkel (DE)

(72) Inventor: Jonas Brandmeier, Harsewinkel (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 260 days.

(21) Appl. No.: 16/782,225

(22) Filed: Feb. 5, 2020

(65) Prior Publication Data
US 2020/0323136 A1 Oct. 15, 2020

(30) Foreign Application Priority Data
Apr. 10, 2019 (DE) ...................... 10 2019 002 637.3

(51) Int. Cl.
*A01D 41/12* (2006.01)
*A01D 41/127* (2006.01)
(Continued)

(52) U.S. Cl.
CPC ..... *A01D 41/1217* (2013.01); *A01D 41/1226* (2013.01); *A01D 41/1275* (2013.01);
(Continued)

(58) Field of Classification Search
CPC ..... A01F 12/46; A01F 12/60; A01D 41/1226; A01D 41/1275; A01D 61/00–61/04;
(Continued)

(56) References Cited

U.S. PATENT DOCUMENTS 3,938,683 A * 2/1976 Bichel ................ A01D 41/1208
414/502
4,029,228 A * 6/1977 Shaver ............... A01D 41/1208
414/505
(Continued)

FOREIGN PATENT DOCUMENTS

DE 32 05 605 A1 8/1983
DE 3827277 A1 * 2/1990 ............. A01F 12/46
(Continued)

OTHER PUBLICATIONS

European Search Report dated Sep. 3, 2020 issued in the corresponding European Application No. 20 15 1416 (with English translation of the relevant parts).

*Primary Examiner* — Alicia Torres
*Assistant Examiner* — Madeline I Runco
(74) *Attorney, Agent, or Firm* — Collard & Roe, P.C.

(57) ABSTRACT

A harvesting machine has a crop tank and a conveyor screw inside the tank which extends from a material inlet opening on a wall of the crop tank into the interior of the crop tank. The conveyor screw comprises at least one proximal portion adjacent to the material inlet opening and one distal portion spaced apart from the material inlet opening at least by the proximal portion. The proximal portion and distal portion are rotatable around conveying axes running in different directions. The conveyor screw can be operated in a work position in which the conveying axis of the distal portion is oriented to be steeper than the conveying axis of the proximal portion.

13 Claims, 4 Drawing Sheets

(51) Int. Cl.
*A01D 61/00* (2006.01)
*A01F 12/46* (2006.01)
*A01F 12/60* (2006.01)
*B65G 33/14* (2006.01)
*A01D 43/073* (2006.01)
*A01D 43/08* (2006.01)

(52) U.S. Cl.
CPC .............. *A01D 61/00* (2013.01); *A01F 12/46* (2013.01); *A01F 12/60* (2013.01); *B65G 33/14* (2013.01); *A01D 43/073* (2013.01); *A01D 43/087* (2013.01)

(58) Field of Classification Search
CPC .... A01D 43/073; A01D 43/087; B65G 33/32; B65G 41/002; B60P 1/40
See application file for complete search history.

(56) References Cited

U.S. PATENT DOCUMENTS

| | | | |
|---|---|---|---|
| 4,106,649 A * | 8/1978 | Nelson | B60P 1/42 414/505 |
| 4,408,947 A * | 10/1983 | Lenski | A01D 41/1208 414/526 |
| 4,669,945 A * | 6/1987 | Pollard | B65G 33/32 198/313 |
| 4,765,190 A * | 8/1988 | Strubbe | A01D 41/1271 222/71 |
| 5,230,419 A * | 7/1993 | Millard | B65G 33/32 198/518 |
| 5,695,399 A * | 12/1997 | Carlson | A01D 41/1208 414/505 |
| 6,248,015 B1 | 6/2001 | Rayfield et al. | |
| 6,508,705 B1 * | 1/2003 | Van Overschelde | A01D 41/1226 296/15 |
| 6,767,174 B2 * | 7/2004 | Cresswell | B60P 1/42 198/668 |
| 7,093,707 B2 * | 8/2006 | Matousek | A01D 41/1208 198/666 |
| 7,585,214 B1 * | 9/2009 | Johnson | A01D 41/1208 460/119 |
| 9,215,843 B2 * | 12/2015 | Cooksey | A01D 41/1226 |
| 9,615,509 B2 * | 4/2017 | Flickinger | A01D 41/1217 |
| 9,775,297 B2 * | 10/2017 | Ricketts | A01F 12/46 |
| 9,901,030 B2 * | 2/2018 | Matousek | A01D 61/008 |
| 9,907,228 B2 * | 3/2018 | Vandevelde | A01F 12/446 |
| 10,292,327 B2 * | 5/2019 | Ducroquet | A01D 41/127 |
| 10,399,787 B2 * | 9/2019 | Rodrigues | A01D 90/02 |
| 10,492,363 B2 * | 12/2019 | Matousek | A01D 41/1208 |
| 10,986,776 B2 * | 4/2021 | Ducroquet | A01D 41/127 |
| 2012/0155996 A1 | 6/2012 | Horst | |

FOREIGN PATENT DOCUMENTS

| | | | | |
|---|---|---|---|---|
| DE | 4419435 A1 | 12/1995 | | |
| DE | 10153790 A1 * | 5/2003 | ............. | A01F 12/46 |
| EP | 0039427 B1 * | 2/1986 | ......... | A01D 41/1208 |
| EP | 0391309 A1 * | 10/1990 | ......... | A01D 41/1208 |
| EP | 0 478 847 A1 | 4/1992 | | |
| EP | 0503739 A1 * | 9/1992 | ............. | B65G 33/32 |
| EP | 0440978 B1 * | 1/1995 | ......... | A01D 41/1208 |
| EP | 0750834 A1 * | 1/1997 | ............. | A01F 12/44 |
| EP | 1120027 A1 | 8/2001 | | |
| EP | 2168419 B1 * | 5/2013 | ......... | A01D 41/1208 |

* cited by examiner

HARVESTING MACHINE AND SWIVEL CONVEYOR SCREW THEREFOR

CROSS-REFERENCE TO RELATED APPLICATIONS

This application claims priority under 35 USC 119 of German Application No. DE102019002637.3, filed on Apr. 10, 2019, the disclosure of which is herein incorporated by reference.

BACKGROUND OF THE INVENTION

The present invention is directed to a harvesting machine such as a combine harvester, in particular to the filling of a crop tank of the harvesting machine, and to a conveyor screw formed for the harvesting machine.

Since grain falls down from the non-grain constituents during threshing, it must be conveyed upward subsequently in order to fill a grain tank of the combine harvester. An elevator with paddles which circulate on a circulating chain is often used for this purpose. The paddles pick up the grain collected on the floor of the threshing unit, lift it up and deliver it into the grain tank via a grain inlet opening in a wall of the grain tank. Accordingly, the grain tank cannot be filled higher than the lower edge of the grain inlet opening.

Therefore, in order to fully utilize the holding capacity of the grain tank, DE 44 19 435 C2 suggests a conveyor screw which is swivelably mounted in the interior of the grain tank at the grain inlet opening, receives grain delivered by the elevator and further lifts the grain. A grain outlet opening of the conveyor screw floats on the grain collected in the tank so that the additionally arriving grain can be delivered without hindrance. Due to the fact that the outlet opening can be raised to the level of the upper edges of the walls of the grain tank, the grain tank can be filled up to these upper edges.

The height which can be bridged in this way is limited by the horizontal dimensions of the grain tank because the conveyor screw must be accommodated in a slightly inclined position in the interior of the tank.

A conveyor screw with two portions which are rotatable around intersecting conveying axes is known from EP 1 120 027 B1. In view of the fact that a proximal portion directly adjoining the grain inlet opening of the tank has a vertical conveying axis, a large difference in height can be overcome on a small floor surface. However, the problem arises that grain lifted by the conveyor screw tends to fall back into the elevator through the grain inlet opening, which can block the elevator and make it necessary to interrupt the harvesting process.

SUMMARY OF THE INVENTION

It is an object of the invention to provide a harvesting machine and a conveyor screw for installation in a crop tank of a harvesting machine which, on limited floor surface of the crop tank, make it possible to reliably lift the crop to a delivery point which is situated as high as possible.

This object is accomplished by a harvesting machine with a crop tank and a conveyor screw inside the tank which extends from a material inlet opening on a wall of the crop tank into the interior of the crop tank and comprises at least one proximal portion adjacent to the material inlet opening and one distal portion spaced apart from the material inlet opening at least by the proximal portion. The proximal portion and distal portion are rotatably drivable for conveying the crop around conveying axes running in different directions. The conveyor screw can be operated in a work position in which the conveying axis of the distal portion is oriented to be steeper than that of the proximal portion. Accordingly, the relatively less steep proximal portion ensures a problem-free transfer of material from the elevator, and the transfer of material from the proximal portion to the distal portion is successful in spite of the steepness of the latter because, unlike the elevator, the proximal portion of the screw is capable of pushing crop into the succeeding portion of the screw.

The conveying axis of the distal portion may be vertical in the work position.

In the work position, the distal portion should be located as centrally as possible in the crop tank so that the peak of a cone of repose forming at the material outlet opening can rise as far as possible above the upper edge of the crop tank at the greatest possible distance from the walls of the tank. For this reason, the distances of the material outlet opening from the two opposite walls of the tank should advisably differ by no more than one half of the smaller distance. Preferably, the material outlet opening should be no farther than 100 mm, preferably no farther than 50 mm, from the center point of a cross-sectional surface of the tank.

The conveyor screw may be formed as a contiguous constructional unit which is swivelably connected to the wall preferably via a first joint defining a first joint axis, so that the steepness at least of the proximal portion can be varied by swiveling around the first joint axis. This first joint axis can be oriented horizontal and parallel to the wall. But it may also be useful to select a different orientation, possibly so that the conveyor screw can be stored in an idle position in a space-saving manner in the crop tank.

In order to bring the distal portion out of the vertical orientation occupied in the work position into a space-saving orientation in the idle position, the distal portion can be swivelably connected to the proximal portion through a second joint defining a second joint axis.

The second joint axis can intersect the conveying axis so as to allow the angle between the conveying axes of the distal portion and proximal portion to be varied.

According to a preferred configuration, the angle between the conveying axes of the distal portion and proximal portion is fixed, and the conveying axis of the proximal portion coincides with the joint axis of the distal portion.

The joints can be coupled to one another so as to swivel simultaneously so that the proximal portion and the distal portion can be driven jointly to pass from the work position into the idle position and back again. A coupling of this kind can be produced in particular by a belt or link which acts at the distal portion and a wall of the grain tank remote of the first joint axis.

It is also conceivable that the proximal portion and distal portion of the conveyor screw are formed as separate constructional units. A particularly space-saving idle position can be realized in that they are movable separate from one another between the work position and idle position and are sufficiently closely adjacent to one another, possibly only in the work position, to enable a transfer of material between them because an outlet end of the proximal portion and an inlet end of the distal portion may be spaced apart from one another in the idle position.

In order to increase the holding capacity for grain without simultaneously increasing the overall height of the combine harvester beyond the limits set forth in the German Road Traffic Ordinance, it is known, per se, to provide a combine harvester with a fold-out tank attachment which can be laid flat for road travel but folded out for harvesting use in order to expand the crop tank upwardly. When using a tank attachment of this type, the problem arises that when the level of the grain in the tank attachment is higher than the material outlet opening of the conveyor screw, additionally arriving grain must be pressed into the grain tank against the pressure of grain already charging the material outlet opening. This is only possible through the application of high driving power that increases sharply with the fill level resulting in increased grain breakage and wear in the drivetrain and screws.

Therefore, it is particularly important in a combine harvester of this type to have a conveyor screw that can overcome a great difference in height on a small surface area and, therefore, combine harvesters with a tank attachment constitute a preferred field of use for the present invention.

In a harvesting machine with tank attachment, the conveyor screw should engage in the tank attachment from below in its work position in order to fill the tank to the highest possible fill level without having to work against a resistance of the tank contents.

In the work position of the conveyor screw and of the tank attachment, the material outlet opening of the distal portion is situated at least as high as a lowest point of the upper edges of the wall plates.

In an idle position, the conveyor screw should be lowered below the upper edges of the tank so as not to prevent the tank attachment from folding together.

An actuator for displacing the conveyor screw between the idle position and the work position should be controllable remotely, particularly via an operator control in the driver's cab.

In order to drive the distal portion of the conveyor screw in rotation, the portions are preferably coupled to one another by a bevel gear unit. Accordingly, one drive acting on the proximal portion via a rotary feedthrough of the wall of the grain tank, for example, is sufficient to also drive the distal portion.

The portions of the conveyor screw are preferably coupled by a bevel gear unit. A bevel gear unit of this kind can comprise, in particular, a universal joint or wide-angle joint.

In order to reliably transfer additionally arriving crop material from the elevator and convey it with as few losses as possible, the conveyor screw should be surrounded by a tube. In particular, this avoids unnecessary grain breakage and high expenditure on drive energy for useless digging work of the conveyor screw which would result if the grain already located in the tank flowed freely to the conveyor screw and a volume from which the grain has been carried away by the conveying action of the conveyor screw could fill up again without hindrance.

The tube can have at least one opening at its circumference that allows crop to exit from the tube into the crop tank provided the latter is not yet filled to the height of the opening. This also contributes to minimizing energy expenditure for conveying the crop and minimizing the proportion of broken crop.

It is conceivable to use a continuous, bending tube to surround the two portions of the conveyor screw. However, the construction is substantially simplified when the proximal portion and distal portion of the conveyor screw are surrounded by a proximal portion and distal portion of the tube, respectively. The above-mentioned opening via which crop material can still escape from the conveyor screw before reaching the actual material outlet opening can then be formed by a gap between the two portions.

Alternatively, it may be useful to provide the tube only at the proximal portion of the conveyor screw and not at the distal portion.

A gap via which grain can exit directly into the tank may also be provided between the wall and the proximal portion of the tube, via which gap the crop can completely bypass the conveyor screw provided the fill level in the tank is low enough to allow passage of the crop into the tank via the gap.

In order to relieve the crop passing into the proximal portion or from the proximal portion to the distal portion from the weight of the crop material possibly arriving on top of it in the tank and to avoid unnecessary digging due to grain flowing back out of the tank to the conveyor screw, the gap preferably extends only over a lower portion of the circumference of the conveyor screw.

The rate of rotation of the conveyor screw can be controlled by means of a mass flow sensor. A sensor of this kind can be provided at any location in the crop flow in the combine harvester, preferably at the flow of grain or grain-chaff mixture behind the output of a threshing unit. Expenditure of energy and digging work can also be minimized in that the rate of rotation of the conveyor screw is controlled based on the mass flow, preferably proportionate to the mass flow.

In a conveyor screw for mounting at a material inlet opening in a wall of a crop tank of a harvesting machine with a proximal portion and a distal portion which are rotatable around intersecting conveyor axes, the above-stated object is further met in that a base is swivelably connected to the proximal portion via a first joint for fastening to the wall.

BRIEF DESCRIPTION OF THE DRAWINGS

Further features and advantages of the invention will be apparent from the following description of embodiment examples referring to the accompanying drawings. In the drawings.

DETAILED DESCRIPTION OF THE EMBODIMENTS

Figure 1:
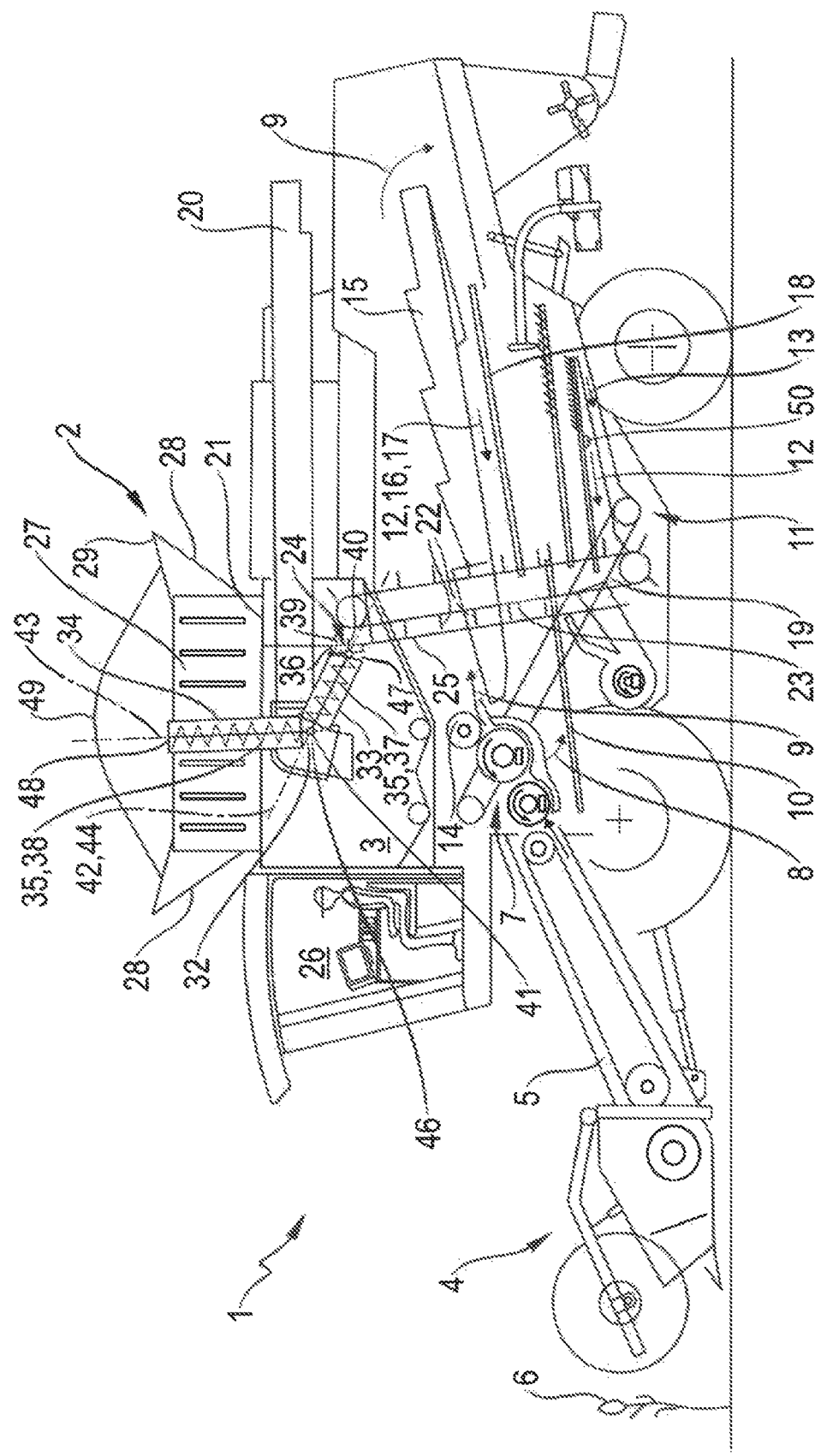
FIG. 1 shows a schematic section through a combine harvester with conveyor screw according to the invention.

FIG. 1 shows a schematic longitudinal section through a combine harvester 1 with a foldable attachment 2 for increasing the volume of a grain tank 3. The combine harvester 1 is outfitted on the front side with a cutting mechanism 4 which is arranged at an inclined conveyor 5. The combine harvester 1 picks up the crop 6 with the cutting mechanism 4 and feeds it to the inclined conveyor 5. The inclined conveyor 5 transfers the crop 6 to a downstream threshing unit 7. The threshing unit 7 prepares the crop 6 which is divided into a grain-chaff mixture 8 and a material flow 9 comprising threshed out stalks. The grain-chaff mixture 8 is conveyed via a preparation floor 10 directly to a cleaning device 11 which separates the grain 12 from the material other than grain 13, i.e., from stalk parts and chaff parts.

An impeller 14 which rotates in counterclockwise direction and conveys the crop flow 9 comprising threshed stalks to a straw walker 15 is arranged behind the threshing unit 7. The straw walker 15 separates grain 12 still remaining in the material flow 9, short straw 16 and chaff 17 which also arrive in the cleaning device 11 via a return pan 18. The grains 12 separated by the cleaning device 11 are conveyed by a grain elevator 19 into the grain tank 3. A mass flow sensor 50 for detecting the mass flow of the grain is arranged, for example, along the path of the grain from the cleaning device 11 to the grain elevator 19.

The grain elevator 19 comprises a continuously circulating belt 23 outfitted with paddles 22. The paddles 22 transfer the grain from the cleaning device 11 and convey it upward in a chute to an opening 24 in a wall 25 of the grain tank 3.

The grain tank 3 is constructed as a receptacle with a substantially rectangular footprint and is arranged behind a driver's cab 26 of the combine harvester 1. The grain tank 3 is open at its upper side, and a plurality of plates 27, 28 forming the attachment 2 are articulated at upper edges 21 of its walls. The plates 27, 28 are swivelable between a closed position in which they overlap one another over the opening and a work position, shown in FIG. 1, in which the attachment 2 expands the grain tank 3 upward in a funnel-shaped manner.

Figure 2:
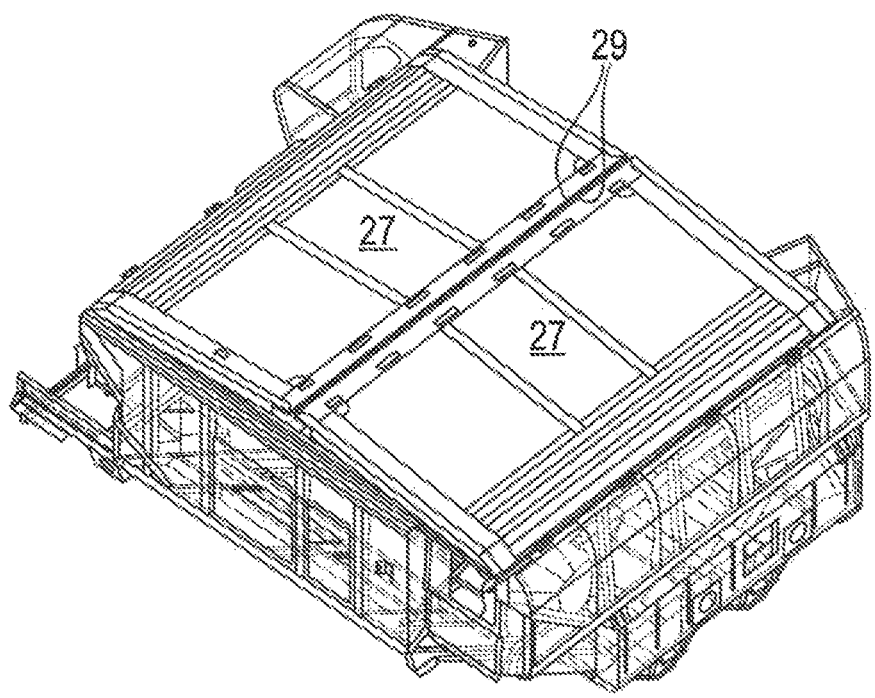
FIG. 2 shows a perspective view of a grain tank attachment of the combine harvester in closed position for road travel.

FIG. 2 shows a perspective view of the grain attachment 2 in the closed position. The open upper side of the grain tank 3 is rectangular but not necessarily square; in this instance, the shorter edges of the rectangle extend in longitudinal direction of the combine harvester 1, and the two plates 27 articulated at the shorter edges are dimensioned such that their edges 29 remote of the joint approximately contact one another and they completely conceal the plates 28 situated below them.

Figure 3:
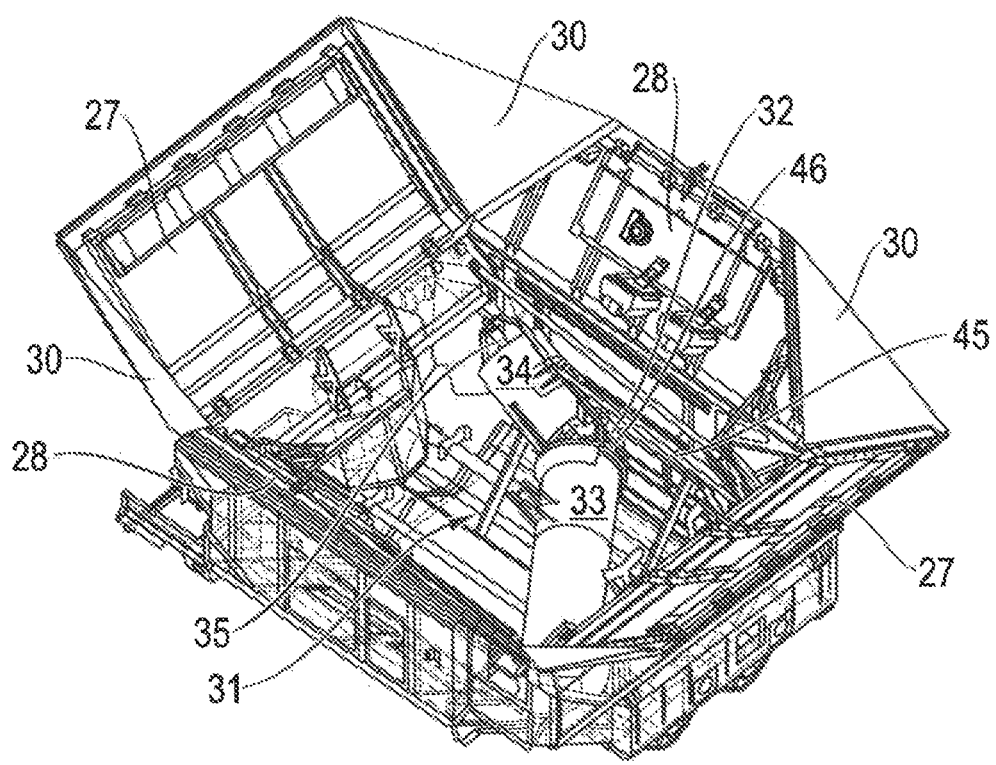
FIG. 3 shows the grain tank attachment in open position with the conveyor screw in idle position.

In the view shown in FIG. 3, the plates 27, 28 are swiveled into their work position, also shown in FIG. 1, in which they expand the grain tank 3 upward in a funnel-shaped manner together with triangular elements 30 connecting the short edges of the plates 27, 28.

In the position shown in FIG. 3, the plates 27, 28 expose a conveying assembly 31 in the interior of the grain tank 3 to view. The conveying assembly 31 comprises two tube portions 33, 34 which meet one another at an obtuse angle at an elbow 32 and a conveyor screw 35 (see FIG. 1) of which a proximal portion 37 is received in tube portion 33 and a distal portion 38 is received in tube portion 34. A base 36 of the conveying assembly 31 is mounted at the wall 25 adjacent to the opening 24 so as to locate the tube portion 33 in front of the opening 24 in such a way that grain conveyed through the opening 24 can be received by the conveyor screw 35.

For this purpose, an open end of the tube portion 33 can be located directly in front of the opening 24. The open end is preferably offset sideward and downward relative to the opening. The sideward offset allows the shaft 40 to be guided through the wall 25 without a space conflict with the grain elevator 19; as a result of the downward offset, grain that is fed via the opening 24 can slide in the interior of the tank in front of the open end and be received there by the conveyor screw 35.

Tube portion 33 is swivelable around a horizontal joint axis 39 parallel to the wall 25. Portions 37, 38 of the conveyor screw 35 are connected to one another and to a driveshaft 40 extending through the opening 24 in each instance via universal joints 41 and are rotatable around conveying axes 42, 43 coincident with the longitudinal axes of the tube portions 33, 34. In the depicted position, tube portions 33, 34 extend horizontally or, if need be, sloping upward slightly from the opening 24 so that they can also be accommodated in the grain tank 3 in the closed position of the attachment 2.

Tube portion 34 is connected to tube portion 33 so as to be swivelable around a joint axis 44 which coincides with the proximal conveying axis 42 in this instance. A strap 45 which holds the tube portion 34 in a slightly upward sloping orientation is tensioned between tube portion 34 and a wall of the grain tank 3. Instead of the strap 45, a rod connected in an articulated manner to the tube portion 34 and the wall could also be provided.

Tube portions 33, 34 do not surround the conveying screw 35 over its entire length gaplessly; a gap 46 between tube portions 33, 34 at an outer side of the elbow 32 will be discerned in FIG. 3; a corresponding gap 46 (see FIG. 1) can be provided between tube portion 33 and wall 25.

The driveshaft 40 can be coupled to a drive of the elevator 19 fixedly or detachably via a clutch so as to run along with the elevator 19 in a compulsory manner or only when needed. Provided the fill level of the grain tank 3 lies below the opening 24, the grain conveyed from the elevator 19 arrives in the grain tank 3 via gap 47, and the conveyor screw 35 idles or can be uncoupled.

At the latest, the conveyor screw 35 is put into operation as soon as the grain in the grain tank 3 reaches the gap 47, and additionally arriving grain can no longer exit from the gap 47. This can happen initially in the position shown in FIG. 3 and initially results in a majority of the grain exiting the conveying assembly 31 at the gap 46. Since the difference in height between gaps 47 and 46 is small, the required drive power is low.

Figure 4:
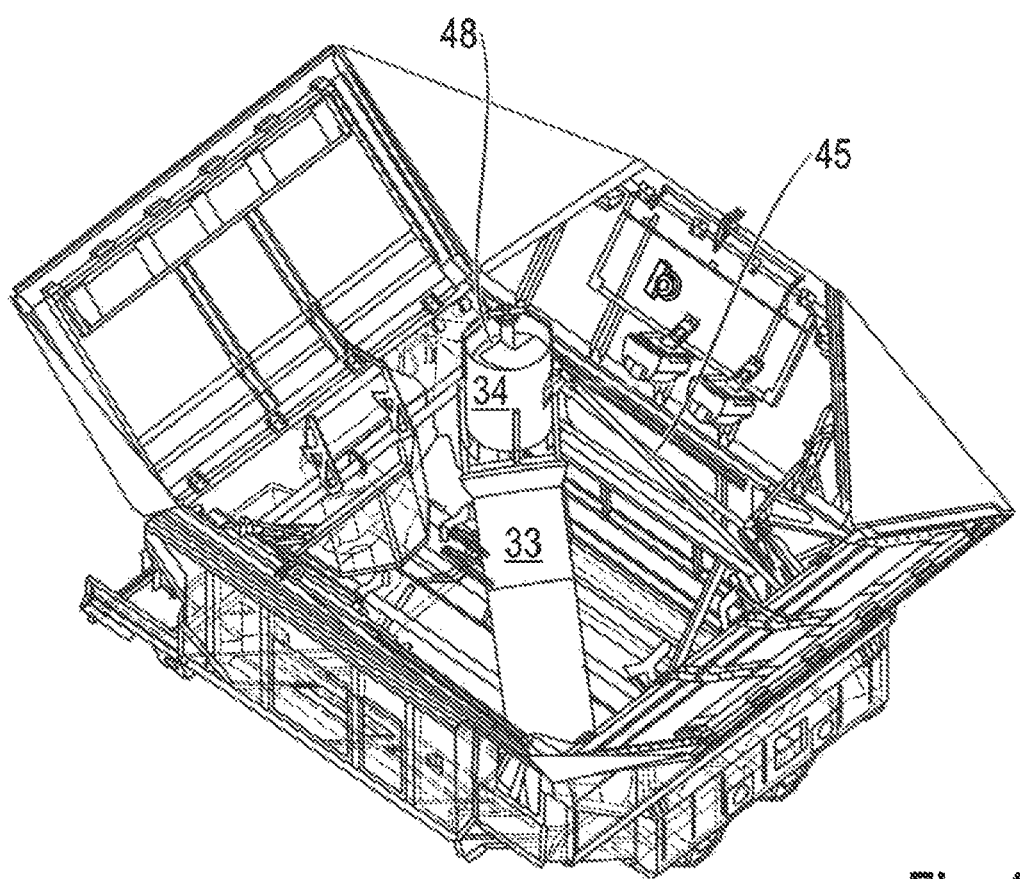
FIG. 4 shows the open grain tank attachment with the conveyor screw in work position.

However, it is also conceivable to put the conveying assembly in the work position shown in FIG. 4 right from the start of the harvesting operation. In this position, the tube portion 33 and, with it, the proximal portion 37 of conveyor screw 35 extending therein is swiveled around the joint axis 39 into an upward-sloping position. The slope of the proximal conveying axis 42 amounts to at least 30°, preferably approximately 45°, in this instance. The elbow 32 is located centrally over the open top side of the grain tank. Tube portion 34 is swiveled into a vertical orientation by the tractive effect of the strap 45.

In this position also, grain enters the grain tank 3 at the gap 47 until the grain level in the tank 2 reaches the gap 47; after this point, additionally arriving grain is further conveyed to gap 46 and accordingly forms a cone of repose in the tank 3 with its peak situated centrally below gap 46.

As soon as the peak reaches the gap 46 and the grain can no longer exit from there, it is lifted by the distal portion 38 of the conveyor screw 35 until an outlet opening 48 at the upper end of the tube portion 34. The fill level of the grain can accordingly rise further, and even if the peak of the cone of repose reaches the outlet opening 48 grain can continue to be pressed into the tank 3 and attachment 2 by means of the conveyor screw 35 so that the level of the grain can rise beyond the outlet opening 48. As a result of the central placement of the outlet opening, the cone of repose, as is shown in FIG. 1 and designated by 49, can grow appreciably past the upper edges of the plates 27, 28 of the attachment 2, and the holding capacity of the attachment 2 can be utilized to the utmost before it is necessary to empty the tank via an unloading conveyor.

As long the conveying assembly 31 is covered by grain, its position inside of the tank 3 and the attachment 2 is fixed. As soon as the level of grain has dropped far enough to free the conveying assembly 31 again, the conveying assembly 31 can swing back into the position shown in FIG. 3. The weight of the tube portion 34 is sufficient to also allow tube portion 34 to swivel downward around the joint axis 44 when tube portion 33 is swiveled downward around joint axis 39.

The swiveling movements of plates 27, 28 and of tube portion 33 can be mechanically coupled to one another or driven by coupled-controlled motors in order to ensure that the conveying assembly 31 automatically changes to the position shown in FIG. 4 when the attachment 2 is open and that the conveying assembly 31 deflects downward promptly when the attachment 2 is closed so as not to be in the way of the movement of the plates 27, 28. An operator control by which the motors can be controlled for swiveling the flaps 27, 28 and tube portion 33 is provided in the driver's cab 26.

According to an embodiment not specifically shown in the drawing, the distal tube portion 34 can be omitted. As a consequence, when the distal portion 38 of the conveyor screw is not yet completely buried beneath grain, additionally arriving grain is conveyed by the conveyor screw only until directly at the surface of the grain collected in the tank and is discharged from there by the screw. Therefore, the conveying height is no higher than is absolutely necessary, which has an advantageous result for drive energy consumption.

Figure 5:
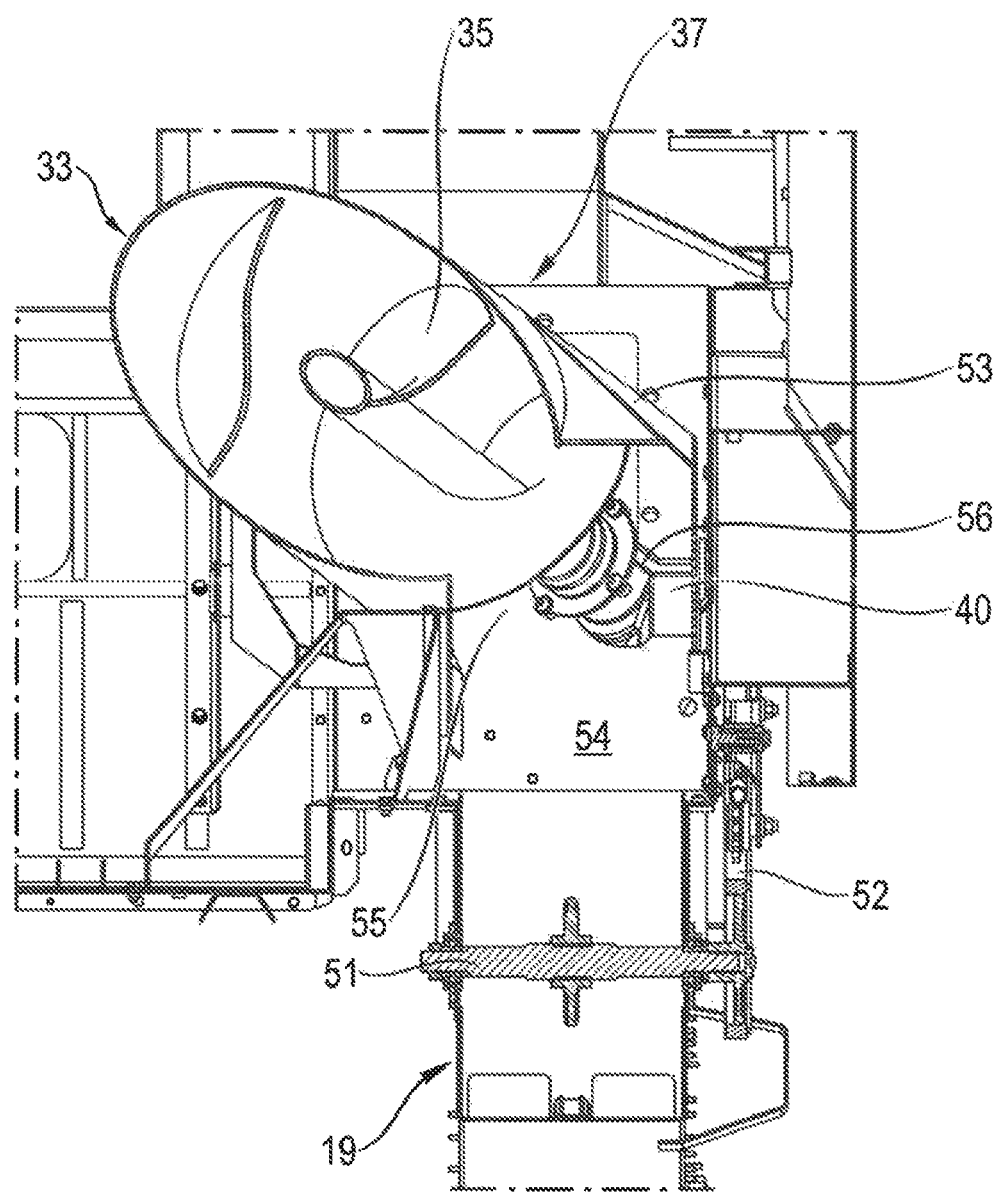
FIG. 5 shows a schematic section through a conveying assembly.

FIG. 5 shows a schematic section through the base 36 of a conveying assembly 31 according to a preferred embodiment. The section runs parallel to the wall 25 in the plane containing the joint axis 39. Driveshaft 40 extends perpendicular to the section plane and intersects the wall 25 at a location which is offset sideward relative to the elevator 19 and at which there is room at the outer side of the wall 25 outside of the grain tank 3 for a motor or a gear unit driving the driveshaft 40. The motor can be an electric motor or a hydraulic motor which is driven in turn by a propulsion motor of the combine harvester 1. At least one of either hydraulic motor or pump can have an adjustable displacement in order to vary the speed ratio between the propulsion motor and the shaft 40. A variator belt drive, for example, is contemplated as a variable speed ratio transmission. The rate of rotation of the shaft 40 or speed ratio is controlled based on the mass flow of grain acquired by the above-mentioned mass flow sensor 50.

FIG. 5 shows a horizontal section through a corner of the grain tank 3. The section runs through an upper deflecting shaft 51 of the grain elevator and the opening 24 of wall 25 adjacent thereto. Driveshaft 40 extends below the section plane parallel to the deflecting shaft 51, which facilitates coupling of the drive shaft 40 and deflecting shaft 51 via a belt drive 52. A bevel gear unit 56 will be discerned between the driveshaft 40 and the proximal portion 37 of the conveyor screw 35. Within the grain tank 3, a housing 53 surrounds the opening 24 and an open end 54 of the tube portion 33 of the conveyor screw. At its underside, housing 53 has an opening 55 so that grain introduced via the opening 24 can fall out of the housing without reaching the conveyor screw provided the fill level in the grain tank 3 is lower than the opening 55. Not until opening 55 is blocked by grain does the grain level in housing 53 rise to the point where the conveyor screw 35 catches hold of grain. Therefore, the operation of the conveyor screw 35 does not require drive power to a significant extent until the opening 55 is blocked and grain is actually lifted by the conveyor screw 35.

REFERENCE NUMERALS 1 combine harvester
2 attachment
3 grain tank
4 cutting mechanism
5 inclined conveyor
6 crop
7 threshing unit
8 grain-chaff mixture
9 material flow
10 preparation floor
11 cleaning device
12 grain
13 material other than grain
14 impeller
15 straw walker
16 short straw
17 chaff
18 return pan
19 grain elevator
20 unloading conveyor
21 upper edge
22 paddle
23 belt
24 opening
25 wall
26 driver's cab
27 plate
28 plate
29 edge remote of joint
30 triangular element
31 conveying assembly
32 elbow
33 tube portion
34 tube portion
35 conveyor screw
36 base
37 proximal portion
38 distal portion
39 joint axis
40 driveshaft
41 universal joint
42 conveying axis
43 conveying axis
44 joint axis
45 strap
46 gap
47 gap
48 outlet opening
49 cone of repose
50 mass flow sensor
51 deflecting shaft
52 belt drive
53 housing
54 open end
55 opening
56 bevel gear unit

What is claimed is:

1. A harvesting machine comprising:
a crop tank, and
a conveyor screw inside the crop tank, the conveyor screw extending from a material inlet opening on a wall of the crop tank into an interior of the crop tank and comprising at least one proximal portion adjacent to the material inlet opening and one distal portion spaced apart from the material inlet opening at least by the proximal portion, wherein the proximal portion and distal portion are rotatable around conveying axes running in different directions, wherein the conveyor screw is configured to be operated in a work position in which the conveying axis of the distal portion is oriented to be steeper than the conveying axis of the proximal portion, and wherein the conveyor screw is swivelably connected to the wall via a first joint defining a first joint axis, and wherein a steepness of at least the proximal portion is variable by swiveling around the first joint axis.

2. The harvesting machine according to claim 1, wherein the conveying axis of the distal portion is vertical in the work position.

3. The harvesting machine according to claim 1, wherein the distal portion is swivelably connected to the proximal portion through a second joint defining a second joint axis.

4. The harvesting machine according to claim 3, wherein the second joint axis is the conveying axis of the proximal portion.

5. The harvesting machine according to claim 1, further comprising a tank attachment with wall plates which are articulated at upper edges of walls of the crop tank and which are swivelable between an idle position resting on the crop tank and a work position in which the wall plates rise from the upper edges in order to expand the crop tank upwardly.

6. The harvesting machine according to claim 5, wherein the conveyor screw engages in the tank attachment in its work position and is lowered below the upper edges in the crop tank in an idle position.

7. The harvesting machine according to claim 5, wherein an outlet opening of the distal portion in the work position of the conveyor screw and of the tank attachment is situated at least as high as a lowest point of the upper edges of the wall plates.

8. The harvesting machine according to claim 1, wherein the conveyor screw is surrounded by a tube at least over a portion of a length of the conveyor screw.

9. The harvesting machine according to claim 8, wherein the tube has at least one opening at its circumference that allows crop to exit from the tube into the crop tank.

10. The harvesting machine according to claim 8, wherein the tube surrounds the proximal portion of the conveyor screw, and wherein the distal portion of the conveyor screw is not fully enclosed by the tube.

11. The harvesting machine according to claim 8, wherein a gap is open between two portions of the tube meeting in an obtuse angle or between the tube and the wall.

12. The harvesting machine according to claim 11, wherein the gap extends only over a lower portion of a circumference of the conveyor screw.

13. The harvesting machine according to claim 1, wherein a rate of rotation of the conveyor screw is controlled by a mass flow sensor.

* * * * *